H. ACKERMANN.
Velocipede.
No. 205,330. Patented June 25, 1878.
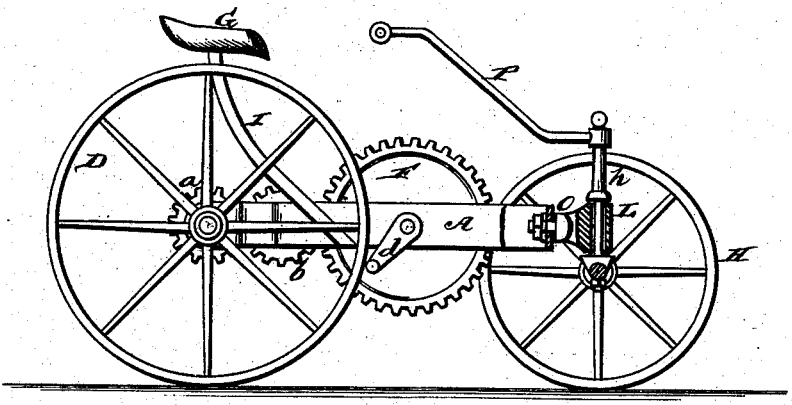
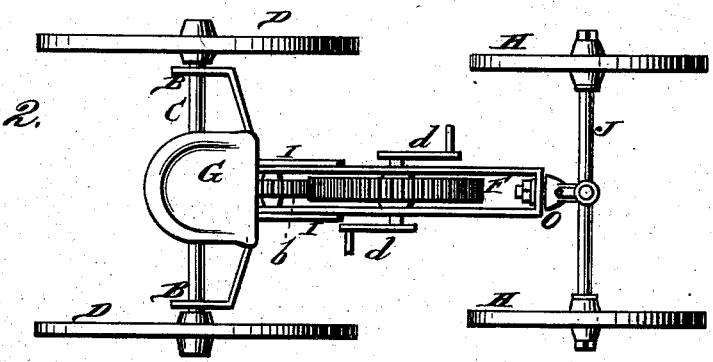

UNITED STATES PATENT OFFICE.

HENRY ACKERMANN, OF CHICAGO, ILLINOIS.

IMPROVEMENT IN VELOCIPEDES.

Specification forming part of Letters Patent No. 205,330, dated June 25, 1878; application filed May 4, 1878.

*To all whom it may concern:*

Be it known that I, HENRY ACKERMANN, of Chicago, in the county of Cook and State of Illinois, have invented a new and valuable Improvement in Propelling - Wagons; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a part-sectional side view of my propelling-wagon, and Fig. 2 is a plan view of the same with lever removed.

This invention relates to certain improvements in velocipedes; and it consists in the novel arrangement of the reach and mode of attaching the front wheels, as will be hereinafter more fully set forth.

The annexed drawing, to which reference is made, fully illustrates my invention.

The reach or frame of my wagon or velocipede is made of a single piece of strap-iron, bent in the center, so as to form two parallel arms or bars, A A, the rear ends of which are bent outward and then rearward, forming the bearings B B for the rear axle C. This axle has the drive-wheels D D secured upon its ends, and in the center is secured a gear-wheel, *a*, which, by an intermediate gear, *b*, is connected with the main gear-wheel F. The gears *b* and F are placed between the bars A A of the reach, and are journaled in the same; and upon the journals of the main wheel F are secured the cranks *d d*, which are located one on each side of the reach, and extend in opposite directions, as shown.

G is the driver's seat, supported upon two arms, I I, which are secured to the reach, as shown.

J is the front axle, provided with the wheels H H, placed loosely upon its ends. In the center of the axle J is secured a vertical shaft, *h*, which extends upward through a tube or sleeve, L, and has upon its upper end a rearwardly-extending lever or handle, P, for turning the front axle to guide the machine.

The tube or sleeve L is provided with a rearward extension, O, which is swiveled in the front end of the reach, the whole thus forming a joint which allows either set of wheels to adapt themselves to any irregularities of the ground.

The vehicle is propelled by the driver working the cranks *d* with his feet, and it is guided by means of the lever P.

What I claim as new, and desire to secure by Letters Patent, is—

A velocipede having the reach made of strap-iron, bent in front, and forming bearings at the rear for the rear axle, and a sleeve at the front end, forming a bearing for the guiding - shaft, and having a rear extension connecting it to the reach, in the manner as described.

In testimony that I claim the above I have hereunto subscribed my name in the presence of two witnesses.

HENRY ACKERMANN.

Witnesses:
 JOHN CROOK,
 ANDREW SWEENEY.